(12) United States Patent
Hidaka et al.

(10) Patent No.: US 12,551,091 B2
(45) Date of Patent: Feb. 17, 2026

(54) ENDOSCOPE CAP, ENDOSCOPE TREATMENT TOOL, AND ENDOSCOPE SYSTEM

(71) Applicant: OLYMPUS CORPORATION, Tokyo (JP)

(72) Inventors: Yuya Hidaka, Tokyo (JP); Yuya Matsuoka, Tokyo (JP); Junji Shiono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 382 days.

(21) Appl. No.: 17/727,043

(22) Filed: Apr. 22, 2022

(65) Prior Publication Data

US 2022/0240763 A1   Aug. 4, 2022

Related U.S. Application Data

(63) Continuation of application No. PCT/JP2019/045049, filed on Nov. 18, 2019.

(51) Int. Cl.
*A61B 1/00* (2006.01)

(52) U.S. Cl.
CPC ...... *A61B 1/00137* (2013.01); *A61B 1/00089* (2013.01); *A61B 2560/04* (2013.01)

(58) Field of Classification Search
CPC ............ A61B 1/00087; A61B 1/00101; A61B 1/00137; A61B 17/29; A61B 1/00098;
(Continued)

(56) References Cited

U.S. PATENT DOCUMENTS

| 5,398,844 A * | 3/1995 | Zaslavsky ........ A61B 17/12013 606/140 |
| 9,402,631 B2 * | 8/2016 | Knotts ............. A61B 17/12013 |

(Continued)

FOREIGN PATENT DOCUMENTS

| EP | 1946707 A2 * | 7/2008 | ......... A61B 1/00087 |
| EP | 1 977 708 A1 | 10/2008 | |

(Continued)

OTHER PUBLICATIONS

Extended European Search Report dated Jun. 23, 2023 received in 19953330.8.

(Continued)

*Primary Examiner* — Michael J Carey
*Assistant Examiner* — Timothy Tuan Luu
(74) *Attorney, Agent, or Firm* — Scully, Scott, Murphy & Presser, P.C.

(57) ABSTRACT

An endoscope cap includes: a hood portion attached to a distal end portion of an endoscope; a cap portion connected to a distal end of the hood portion, having an abutting surface against which the endoscope is abutted in a state of the endoscope being inserted into the hood portion, and protruding from the distal end of the hood portion; a channel tube into which an elongated device is inserted; and a coupling member for coupling the device with the hood portion, the member being supported by the hood portion and extending along the hood portion. The hood portion has a pair of support holes into which the member is inserted. The member is pivotable with respect to the hood portion, with the individual support holes serving as fulcrums. The holes are formed at positions closer to a proximal end of the hood portion than the abutting surface is.

22 Claims, 16 Drawing Sheets

(58) Field of Classification Search
CPC .......... A61B 17/295; A61B 2017/2947; A61B 2017/00292; A61B 2017/00358; A61B 2017/0042
See application file for complete search history.

(56) References Cited

U.S. PATENT DOCUMENTS

| | | | |
|---|---|---|---|
| 2005/0131278 A1 | 6/2005 | Dickopp | |
| 2005/0234297 A1* | 10/2005 | Devierre | A61B 1/00087 600/129 |
| 2008/0177135 A1 | 7/2008 | Muyari et al. | |
| 2008/0249354 A1 | 10/2008 | Muyari et al. | |
| 2014/0066707 A1 | 3/2014 | Muyari et al. | |
| 2016/0029875 A1* | 2/2016 | Okada | A61B 1/00101 600/107 |
| 2017/0251910 A1* | 9/2017 | Surti | A61B 1/00128 |
| 2018/0000321 A1* | 1/2018 | Wales | A61B 17/1285 |
| 2018/0140320 A1* | 5/2018 | Aikawa | A61B 18/1492 |
| 2020/0367727 A1 | 11/2020 | Yahagi et al. | |
| 2021/0068615 A1* | 3/2021 | Johnson | A61B 1/00006 |
| 2021/0196104 A1* | 7/2021 | Hidaka | A61B 1/00137 |
| 2021/0338046 A1* | 11/2021 | Yahagi | A61B 17/00234 |

FOREIGN PATENT DOCUMENTS

| | | |
|---|---|---|
| EP | 2 740 421 A1 | 6/2014 |
| EP | 3 009 086 A1 | 4/2016 |
| GB | 2409165 A | 6/2005 |
| JP | 2003-210389 A | 7/2003 |
| JP | 2008-253597 A | 10/2008 |
| JP | 2010022568 A * | 2/2010 |
| JP | 2012-024597 A | 2/2012 |
| WO | 2014/199759 A1 | 12/2014 |
| WO | 2019/163086 A1 | 8/2019 |

OTHER PUBLICATIONS

Extended European Search Report dated Jun. 13, 2024 received in 24166271.7.

International Search Report dated Feb. 4, 2020 received in PCT/JP2019/045049.

Japanese Office Action dated Feb. 21, 2023 received in 2021-558042.

* cited by examiner

ENDOSCOPE CAP, ENDOSCOPE TREATMENT TOOL, AND ENDOSCOPE SYSTEM

CROSS-REFERENCE TO RELATED APPLICATIONS

This is a continuation of International Application PCT/JP2019/045049 which is hereby incorporated by reference herein in its entirety.

TECHNICAL FIELD

The present invention relates to an endoscope cap, an endoscope treatment tool, and an endoscope system.

BACKGROUND ART

There is a treatment means for early-stage cancer, called ESD (endoscopic submucosal dissection) in which the mucosa including a cancer site is separated at the submucosa. During the separation, a traction device for applying a tensile force to the submucosa is used (for example, see Patent Literatures 1 and 2).

The traction device described in Patent Literature 1 or 2 is of a cap type attached to a distal end portion of an endoscope and supports a gripping device so as to be movable in the longitudinal direction. Advancing and retracting the gripping device in the longitudinal direction cause a gripping portion at the distal end of the gripping device to be lowered and raised in front of the endoscope. Therefore, it is possible to grip and lift the mucosa by means of the gripping device within the visual field of the endoscope.

CITATION LIST

Patent Literature

{PTL 1} PCT International Publication No. WO 2014/199759
{PTL 2} Japanese Unexamined Patent Application, Publication No. 2008-253597

SUMMARY OF INVENTION

An aspect of the present invention is an endoscope cap including: a cylindrical hood portion that is attached to an outer circumferential surface of a distal end portion of an endoscope; a cap portion that is connected to a distal end of the hood portion, that has an abutting surface against which a distal end of the endoscope is abutted in a state in which the distal end portion of the endoscope is inserted into the hood portion, and that protrudes from the distal end of the hood portion in a longitudinal direction of the hood portion; a channel tube into which an elongated device is inserted, wherein a distal end portion of the channel tube is fixed to a proximal end portion of the hood portion, and that extends substantially parallel to a longitudinal axis of the hood portion; and a linear coupling member for coupling the device with the hood portion, the coupling member being supported by the hood portion and extending along an outer circumferential surface of the hood portion, wherein the hood portion has a pair of support holes that are provided at positions separated from each other in a circumferential direction of the hood portion, and into which the coupling member is inserted from an outside toward an inside of the hood portion, the coupling member is pivotable with respect to the hood portion, with the individual support holes serving as fulcrums, and the pair of support holes are formed at positions closer to the proximal end of the hood portion than the abutting surface is.

DESCRIPTION OF EMBODIMENT

An endoscope cap 1, an endoscope treatment tool 20, and an endoscope system 100 according to an embodiment of the present invention will be described below with reference to the drawings.

Figure 1A:
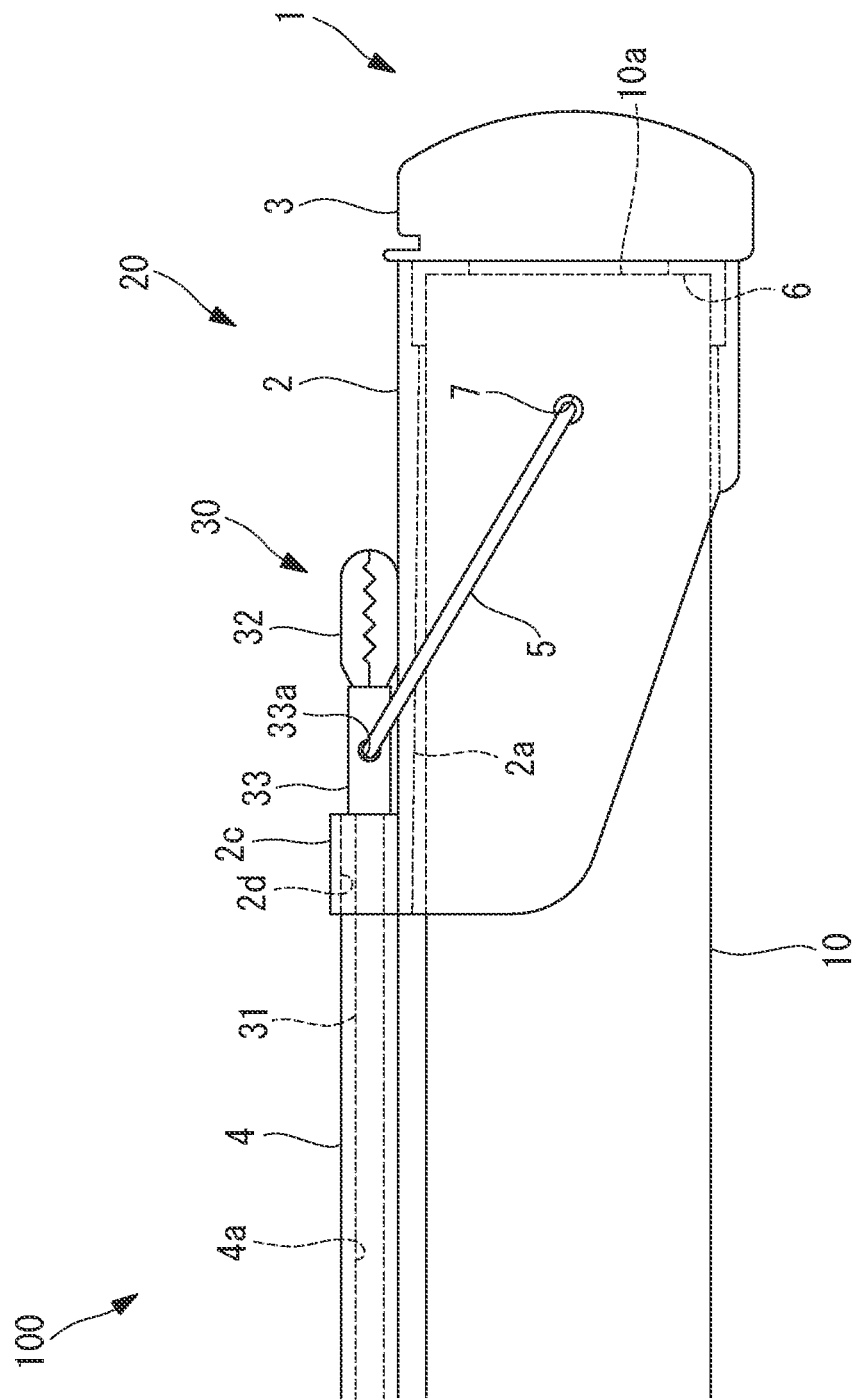
FIG. 1A is a side view showing the configuration of an endoscope cap, an endoscope treatment tool, and an endoscope system according to an embodiment of the present invention.

As shown in FIG. 1A, the endoscope system 100 according to this embodiment includes an endoscope 10 and the endoscope treatment tool 20.

The endoscope treatment tool 20 includes a gripping device 30 and the endoscope cap 1 that supports the gripping device 30 and that is attached to a distal end portion of the endoscope 10.

The gripping device 30 includes: a long, flexible elongated member 31; a gripping portion 32 that is connected to the distal end of the elongated member 31 and that grips biological tissue; and a connector 33 that is provided on the proximal end side of the gripping portion 32. The elongated member 31 is, for example, a coil sheath. The gripping portion 32 has a pair of gripping pieces that can be opened and closed, and can grip biological tissue between the pair of gripping pieces. The connector 33 is provided, for example, between the elongated member 31 and the gripping portion 32, and has a through-hole 33a that penetrates therethrough in a direction orthogonal to a longitudinal direction of the elongated member 31.

The endoscope cap 1 includes: a substantially cylindrical hood portion 2 that is attached to the outer circumferential surface of the distal end portion of the endoscope 10; a cap portion 3 that is connected to the distal end of the hood portion 2; a channel tube 4 that is fixed to a proximal end portion of the hood portion 2; a coupling member 5 that is supported by the hood portion 2 and that couples the hood portion 2 and the gripping device 30; and an abutting surface 6 that positions a distal end 10a of the endoscope 10 to a prescribed position at the distal end or in the vicinity of the distal end of the hood portion 2.

The endoscope cap 1 has a vertical direction and a left-right direction that are orthogonal to each other. The vertical direction and the left-right direction are respectively radial directions of the hood portion 2, and a direction in which the longitudinal axis of the hood portion 2 and the longitudinal axis of the channel tube 4 are arranged is the vertical direction. The vertical direction and the left-right direction of the endoscope cap 1 respectively correspond to the vertical direction and the left-right direction of the endoscope 10.

The hood portion 2 opens at a distal end surface and a proximal end surface, and the distal end portion of the endoscope 10 is inserted from the proximal end side thereof.

The hood portion 2 is mated with the outer circumferential surface of the distal end portion of the endoscope 10, and is fixed to the distal end portion of the endoscope 10 due to friction between the inner circumferential surface of the hood portion 2 and the outer circumferential surface of the distal end portion of the endoscope 10. The inner circumferential surface of the hood portion 2 has a tapered surface 2a the inner diameter of which gradually increases from the distal end toward the proximal end.

Figure 2A:
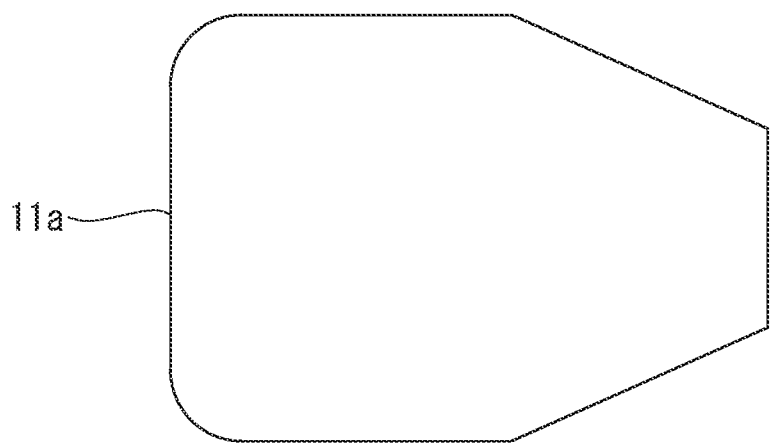
FIG. 2A is a diagram showing an example of a fixing tape for fixing a hood portion to an endoscope.
Figure 2B:
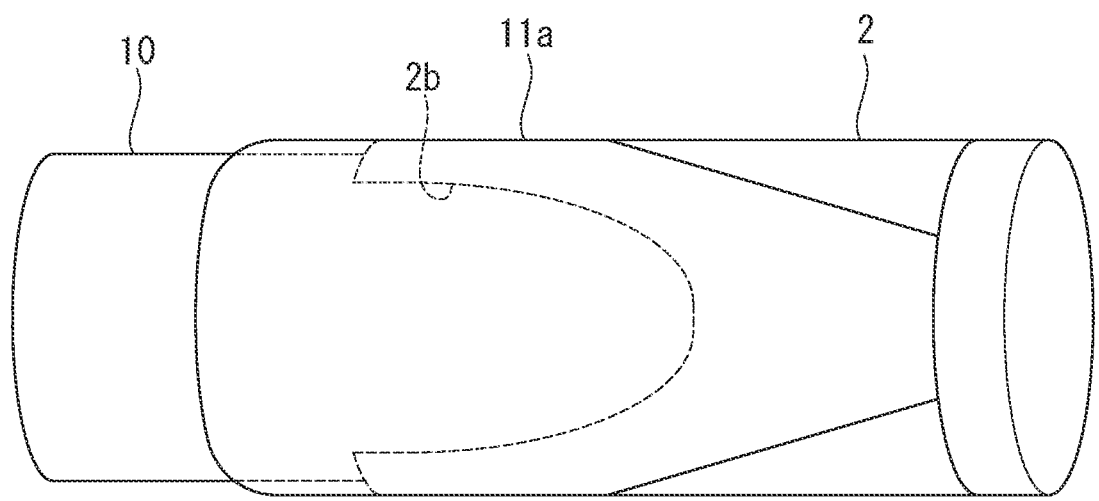
FIG. 2B is a diagram showing a state in which the hood portion is fixed to the endoscope by using the fixing tape in FIG. 2A.
Figure 2C:
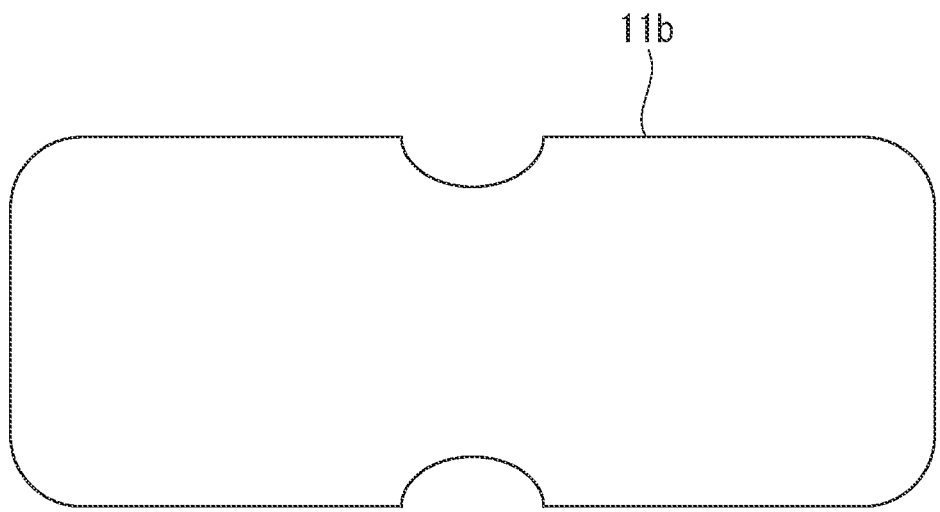
FIG. 2C is a diagram showing an example of a fixing tape for fixing a channel tube to the endoscope.
Figure 2D:
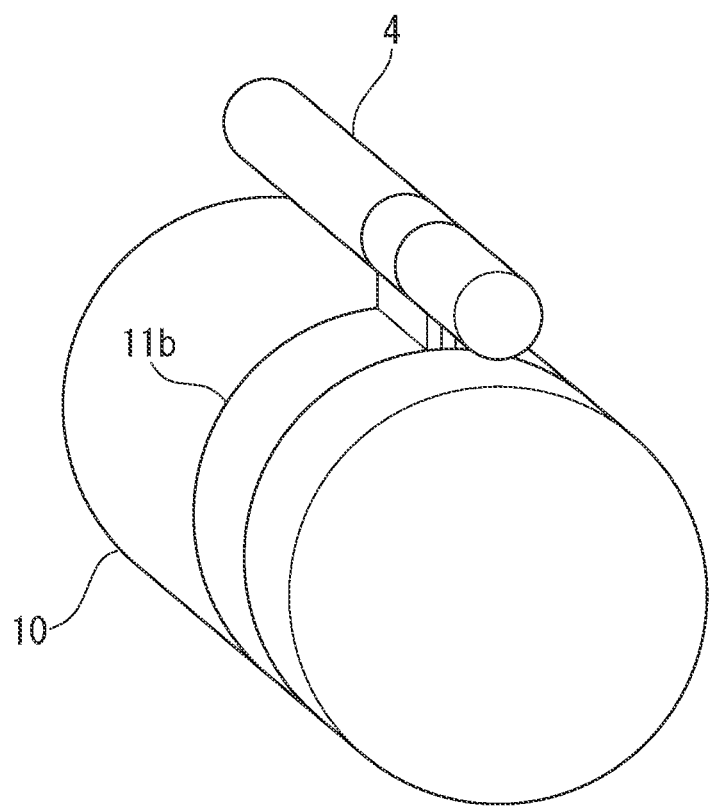
FIG. 2D is a diagram showing a state in which the channel tube is fixed to the endoscope by using the fixing tape in FIG. 2C.

As necessary, a fixing tape 11a having a shape as shown in FIG. 2A may be used for fixing the endoscope 10 and the hood portion 2 to each other. By fixing the endoscope 10 and the hood portion 2 to each other as shown in FIG. 2B, it is possible to improve the fixing strength. FIG. 2B is a bottom view of the hood portion 2 and the endoscope 10 as viewed from below. In addition, a fixing tape 11b having a shape as shown in FIG. 2C may be used to fix the endoscope 10 and the channel tube 4 to each other as shown in FIG. 2D.

Specifically, the hood portion 2 is provided with a notch 2b, which is a portion cut out by a large amount from the proximal end toward the distal end. The edge of the notch 2b and the outer circumferential surface of the endoscope 10, which is exposed from the notch 2b, are covered with the fixing tape 11a. With this configuration, it is possible to ensure a large adhesion range (edge length of the hood portion 2) between the endoscope 10 and the hood portion 2, and to firmly adhere the hood portion 2 and the outer circumferential surface of the endoscope 10 to each other. Therefore, for example, even when a bending portion of the endoscope 10 is bent, the hood portion 2 is less likely to fall off from the endoscope 10. Note that the method of adhering the endoscope 10 and the hood portion 2 to each other by means of the fixing tape 11a is not limited to this embodiment, and, for example, the method can also be employed in a case in which the gripping device 30 is changed to a snare or a knife.

In addition, the hood portion 2 has a pair of support holes 7 for supporting the coupling member 5. The pair of support holes 7 are provided at positions that are separated from each other in the circumferential direction of the hood portion 2 and that face each other in the left-right direction. The individual support holes 7 penetrate from the outer circumferential surface of the hood portion 2 to the inner circumferential surface thereof in the radial direction of the hood portion 2.

The cap portion 3 is a substantially annular member coaxial with the hood portion 2 and protrudes from the distal end of the hood portion 2 in the longitudinal direction of the hood portion 2. The longitudinal dimension of the cap portion 3 is smaller than the focal distance of the endoscope 10, and the focal position of the endoscope 10 is disposed in the vicinity of the distal end of the cap portion 3. In a design example of the endoscope system 100, the focal distance of the endoscope 10 is 10 mm, and the length of the cap portion 3 is 5 mm.

The abutting surface 6 is disposed at the distal end or in the vicinity of the distal end of the hood portion 2, and the distal end 10a of the endoscope 10 is abutted against the abutting surface 6 in a state in which the distal end portion of the endoscope 10 is inserted into the hood portion 2. The abutting surface 6 is provided, for example, at a proximal end portion of the cap portion 3. The cylindrical proximal end portion of the cap portion 3 is mated with an inner side of the distal end portion of the hood portion 2 and is fixed to the distal end portion of the hood portion 2 by means of an adhesive. The abutting surface 6 protrudes radially inward from the inner circumferential surface of the proximal end portion of the cap portion 3. By causing a distal end surface of the endoscope 10 to be abutted against the abutting surface 6, it is possible to position the distal end 10a of the endoscope 10 to the position of the abutting surface 6, which is the prescribed position.

The hood portion 2 and the cap portion 3 may be manufactured by two-color molding. In the case of two-color molding, the distal end of the hood portion 2 is preferably attached to a portion of the cap portion 3. In addition, in the case of two-color molding, the cap portion 3 is preferably formed from polycarbonate, and the hood portion 2 is preferably formed from a polyester elastomer.

A portion of the cap portion 3 is formed so as to be larger than the outer diameter at the distal end of the hood portion 2, and the distal end of the hood portion 2 is in contact therewith. Furthermore, the distal end of the tapered surface 2a is in contact with the most proximal end of the cap portion 3, and the inner diameter of the distal end of the tapered surface 2a is larger than the inner diameter of the cylindrical proximal end portion of the cap portion 3, which is located closer to the proximal end than the abutting surface 6 is.

The cap portion 3 plays the role of lifting peripheral tissue in front of the endoscope 10 in the body to ensure a space in front of the endoscope 10; thus, the cap portion 3 preferably has sufficient rigidity so that the shape thereof can be maintained against a force from the peripheral tissue. Meanwhile, the hood portion 2 is preferably formed of an elastic material from the viewpoint of attachability to the distal end portion of the endoscope 10. By providing the abutting surface 6 in the cap portion 3 having higher rigidity than the hood portion 2, the position of the distal end 10a of the endoscope 10 can be more stabilized.

The hood portion 2 has a protruding portion 2c on the upper side of the proximal end portion of the hood portion 2. The protruding portion 2c has a tunnel 2d (see FIG. 1A) formed so as to penetrate the protruding portion 2c in the longitudinal direction of the hood portion 2, and the distal end and the proximal end of the tunnel 2d communicate with each other. A distal end portion of the channel tube 4 is fixed to the protruding portion 2c in a state in which the channel tube 4 is inserted into the tunnel 2d. The method of fixing the channel tube 4 inside the tunnel 2d may be adhesion by means of an adhesive or may be thermal fusion. The channel tube 4 extends substantially parallel to the longitudinal direction of the hood portion 2. The distal end of the channel tube 4 is located closer to the proximal end of the hood portion 2 than the distal end of the hood portion 2. The channel tube 4 has a channel 4a penetrating the channel tube 4 in the longitudinal direction. The elongated member 31 of the gripping device 30 passes through the channel 4a so as to be movable in the longitudinal direction, and the gripping portion 32 and the connector 33 are disposed closer to the distal end than the channel tube 4 is. The individual support holes 7 are formed at positions closer to the proximal end of the hood portion 2 than the abutting surface 6 is, and are also located closer to the distal end of the hood portion 2 than the distal end of the channel tube 4.

The coupling member 5 is a long, thin linear member such as a thread. The coupling member 5 is disposed outside the hood portion 2 and extends between the pair of support holes 7 via the through-hole 33a of the connector 33. The outer diameter of the coupling member 5 is preferably smaller than the inner diameters of the individual support holes 7. However, the outer diameter of the coupling member 5 may be larger than the inner diameters of the individual support holes 7 as long as the coupling member 5 can be inserted into the support holes 7.

Two end portions of the coupling member 5 are inserted into the support holes 7 from the outside toward the inside, and both ends of the coupling member 5, which are disposed inside the hood portion 2, are fixed at the support holes 7, for example, by means of knots formed at both ends. The knots have widths larger than the inner diameters of the individual support holes 7. With this configuration, the coupling member 5 is supported so as to be pivotable with respect to the hood portion 2, with the pair of support holes 7 serving as fulcrums.

The coupling member 5 is preferably a member that has flexibility and that is substantially or entirely not stretchable in the longitudinal direction, and, for example, a soft thread is preferable. The coupling member 5 may be a wire instead of a thread.

Figure 1B:
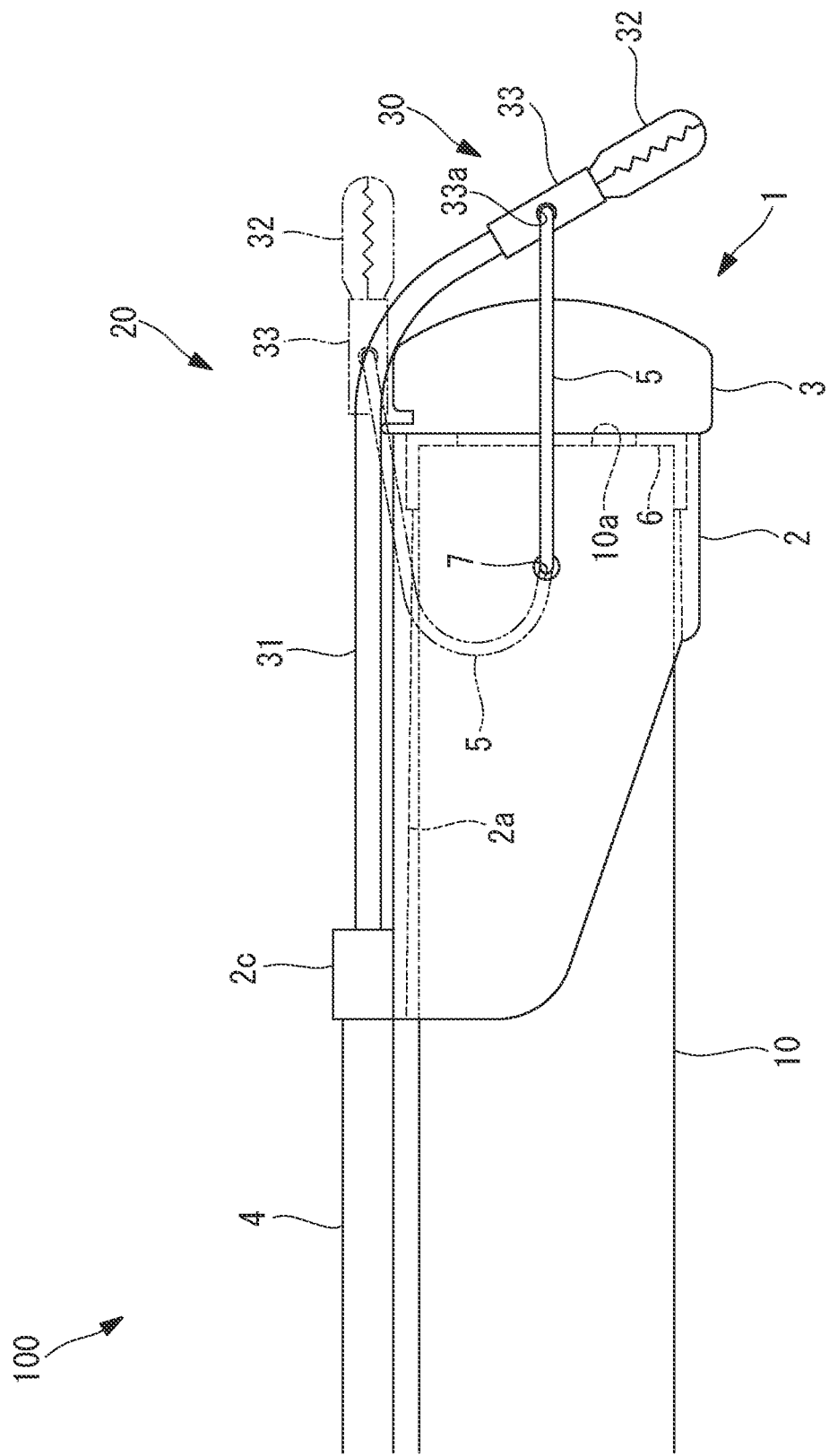
FIG. 1B is a diagram for explaining the operation of the endoscope treatment tool in FIG. 1A and is a diagram showing a state in which a gripping portion is lowered to a lowered position.

As a result of the gripping device 30 and the hood portion 2 being coupled by means of the coupling member 5, the gripping portion 32 moves between the maximum pull-in position shown in FIG. 1A and a lowered position shown in FIG. 1B in accordance with the pushing and pulling operation of the gripping device 30 in the longitudinal direction thereof. The maximum pull-in position is a position where the gripping portion 32 or the connector 33 abuts against the distal end of the channel tube 4 and further movement of the gripping portion 32 toward the proximal end is prevented by the distal end of the channel tube 4.

In other words, as shown in FIG. 1B, when the gripping device 30 is pushed forward in the longitudinal direction, the connector 33 is pivoted from the upper side to the lower side, with the support holes 7 serving as fulcrums, together with the coupling member 5 in front of the cap portion 3, and by doing so, the gripping portion 32 is lowered from the upper side toward the lower side in front of the cap portion 3. In addition, when the gripping device 30 is pulled backward in the longitudinal direction, the connector 33 is pivoted from the lower side to the upper side, with the support holes 7 serving as fulcrums, together with the coupling member 5 in front of the cap portion 3, and by doing so, the gripping portion 32 is raised from the lower side to the upper side in front of the cap portion 3.

It is preferable that the coupling member 5 be relatively movable, inside the through-hole 33a, with respect to the connector 33 in the longitudinal direction of the coupling member 5. The movement of the coupling member 5 inside the through-hole 33a allows relative movement of the gripping device 30 and the hood portion 2 in the left-right direction, and the gripping device 30 and the distal end portion of the endoscope 10 can move mutually independently in the left-right direction. For example, the distal end of the endoscope 10 can be moved in the left-right direction as a result of the bending portion of the endoscope 10 being bent in the left-right direction, while biological tissue gripped by the gripping portion 32 is held at the same position.

The coupling member 5 preferably has such a length that the coupling member 5 is not slackened in a state in which the gripping portion 32 is disposed at the maximum pull-in position. In a case in which the coupling member 5 has a length that causes the coupling member 5 to slacken in the state in which the gripping portion 32 is disposed at the maximum pull-in position, there is a possibility that the gripping portion 32 at the maximum pull-in position may move against the intention of an operator.

Figure 3A:
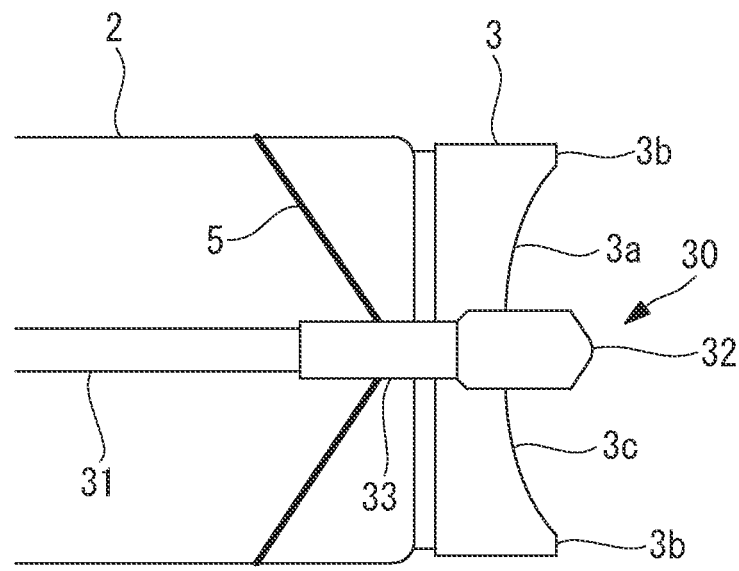
FIG. 3A is a top view of the endoscope cap as viewed from above.
Figure 3B:
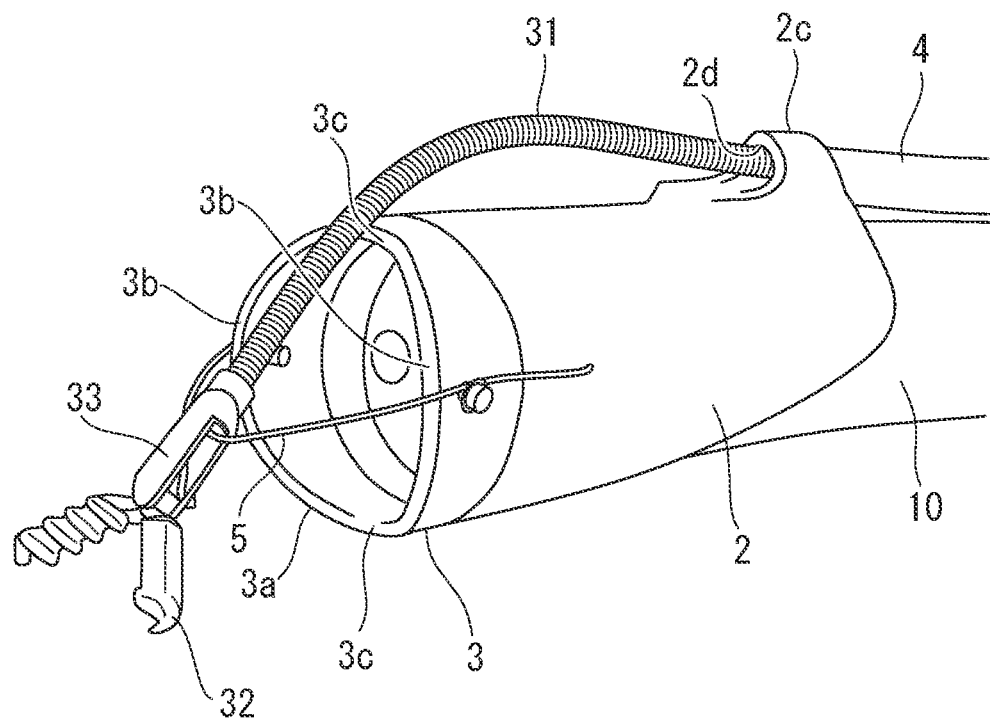
FIG. 3B is a perspective view of the endoscope cap and is a diagram showing a state in which the gripping portion is lowered to the lowered position.

As shown in FIGS. 3A and 3B, an edge 3a at the distal end of the cap portion 3 has projections 3b extending in a direction from the proximal end of the cap portion 3 toward the distal end and a recess 3c extending in a direction from the distal end of the cap portion 3 toward the proximal end.

The recess 3c is provided in an upper portion through which the gripping device 30 passes in a top view orthogonal to the central axes of the individual support holes 7 (throughhole 33a) and the longitudinal axis A of the hood portion 2. The projections 3b gently curve from the recess 3c toward the longitudinal axis A and extend in a convex shape in a side view as viewed from a direction along the central axes of the individual support holes 7 (through-hole 33a).

The recess 3c and the channel tube 4 are arranged in such a positional relationship that the central axis of the channel tube 4 passes through the recess 3c in the top view. The channel tube 4 is fixed to the hood portion 2 so that this positional relationship is established. Thus, by merely advancing the gripping device 30 protruding from the distal end of the channel tube 4, the gripping device 30 passes through the recess 3c of the cap portion 3. With this configuration, the gripping portion 32 can be brought closer to the distal end of the endoscope 10.

When the gripping portion 32 is lowered from the upper side to the lower side in front of the cap portion 3, because the edge 3a gently curves from the recess 3c to the projections 3b, the coupling member 5 can smoothly slide on the edge 3a. Preferably, the coupling member 5 comes into contact with the projections 3b in a state in which the gripping portion 32 is lowered in front of the cap portion 3. In other words, the coupling member 5 is configured to come into contact with the projections 3b when the gripping device 30 passes through the recess 3c. In addition, the coupling member 5 is configured to be pivotable from a first position extending along the outer circumferential surface of the hood portion 2 to a second position at which the coupling member 5 comes into contact with the projections 3b of the cap portion 3.

Next, the operation of the endoscope cap 1, the endoscope treatment tool 20, and the endoscope system 100 will be described.

In order to treat affected tissue S in the body of a patient by using the endoscope system 100 according to this embodiment, the endoscope treatment tool 20 is attached to the distal end portion of the endoscope 10 by fitting the distal end portion of the endoscope 10 into the cap portion 3, as shown in FIG. 1A. At this time, the distal end 10a of the endoscope 10 is positioned at a prescribed position by the abutting surface 6. In addition, the channel tube 4 and the gripping device 30 are disposed on the upper side of the endoscope 10, and the relative positions of the cap portion 3 and the distal end portion of the endoscope 10 about the longitudinal axis are adjusted such that the vertical direction and the left-right direction of the cap portion 3 respectively coincide with the vertical direction and the left-right direction of the endoscope 10.

Next, an assembly of the endoscope 10 and the endoscope treatment tool 20 is inserted into the body, and the distal end portion of the endoscope 10 is placed such that the affected tissue S is located in a lower portion in the visual field of the endoscope 10. Then, the proximal end portion of the elongated member 31 disposed outside the body is pushed toward the distal end to move the gripping portion 32 forward in the longitudinal direction with respect to the endoscope cap 1 and the endoscope 10.

As a result of the gripping portion 32 moving forward, the coupling member 5 is pivoted, with the support holes 7 serving as fulcrums, and as shown in FIG. 1B, the gripping portion 32 is lowered from the upper side to the lower side in front of the distal end 10a of the endoscope 10. Therefore, in an endoscope image, the gripping portion 32 appears from the upper side and moves to the lower side toward the affected tissue S. With this configuration, by merely moving the gripping device 30 forward, the gripping portion 32 can be made to reach the affected tissue S.

Figure 4A:
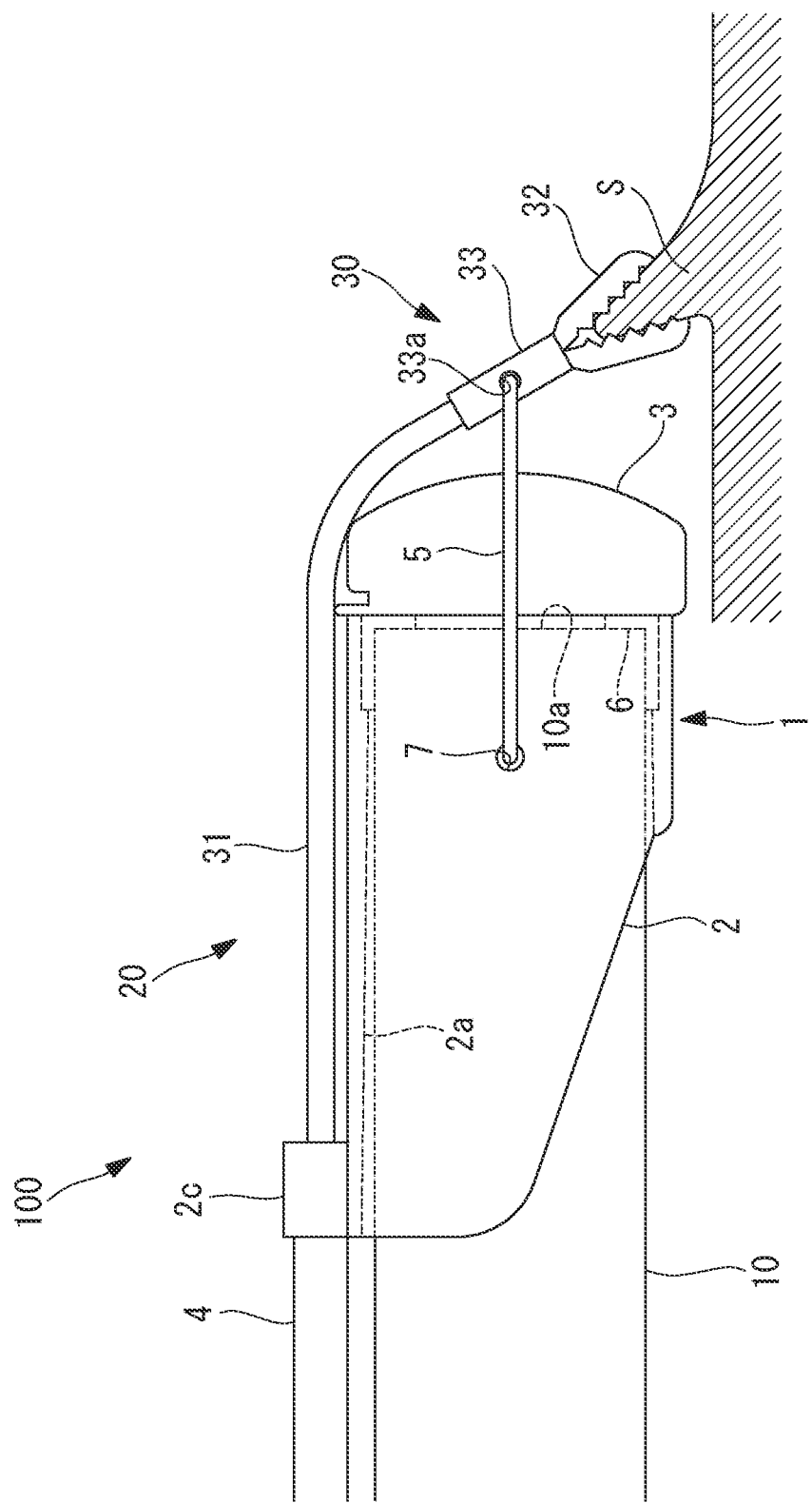
FIG. 4A is a diagram showing an example of a method of using the endoscope system and is a diagram showing a state in which biological tissue is gripped by the gripping portion at the lowered position.
Figure 4B:
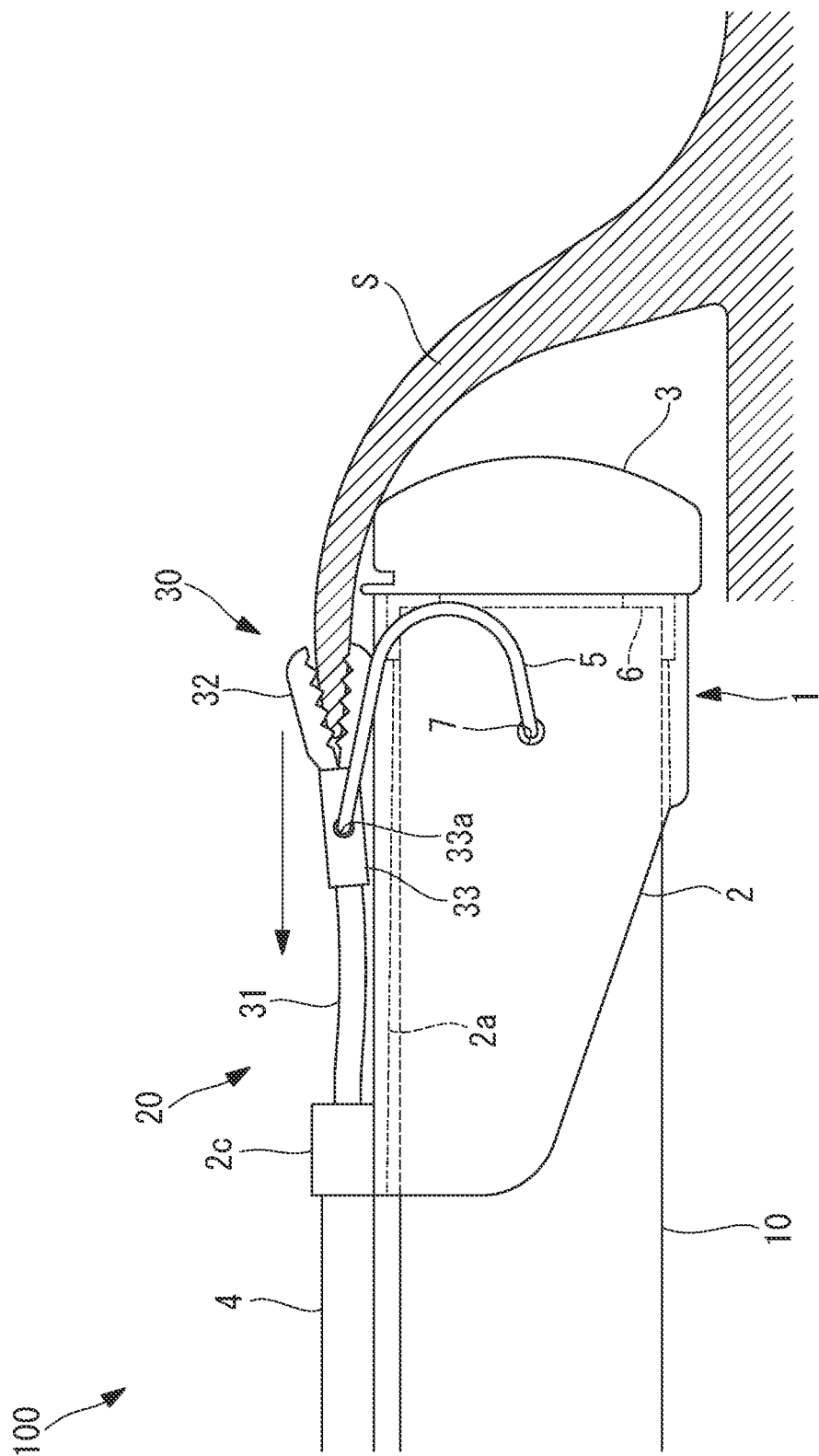
FIG. 4B is a diagram showing an example of a method of using the endoscope system and is a diagram showing a state in which biological tissue is lifted and pulled in by the gripping portion.

Next, as shown in FIG. 4A, the affected tissue S is gripped by the gripping portion 32, and subsequently, as shown in FIG. 4B, the proximal end portion of the elongated member 31 is pulled to lift the gripped affected tissue S. At this time, as indicated by an arrow in FIG. 4B, the gripping portion 32 is pulled to the proximal end side toward the channel tube 4, and thus, the affected tissue S can be pulled in toward the proximal end from the distal end of the cap portion 3. The cap portion 3 ensures a sufficient distance between the lifted affected tissue S and the distal end surface of the endoscope 10. Next, a treatment tool, such as an electric scalpel, is introduced to the affected tissue S through a treatment tool channel (not shown) provided in the endoscope 10, and the lifted affected tissue S is separated by the treatment tool.

Here, the focal position of the endoscope 10 is located in the vicinity of the distal end of the cap portion 3. Therefore, in order to clearly observe the gripping portion 32 with the endoscope 10, it is desirable that the lowered position of the gripping portion 32 be closer to the distal end 10a of the endoscope 10. With this embodiment, the support holes 7 serving as pivoting fulcrums of the coupling member 5 are provided at positions closer to the proximal end than a prescribed position is, the prescribed position being a position at which the distal end of the endoscope 10 is positioned by the abutting surface 6. Therefore, as compared with a case in which the support holes 7 are provided in the cap portion 3, the lowered position of the gripping portion 32 can be brought closer to the distal end 10a of the endoscope 10.

In addition, as a result of the support holes 7 being provided at positions closer to the proximal end than the prescribed position is, the gripping portion 32 can be disposed at a position closer to the proximal end as compared with the case in which the support holes 7 are provided in the cap portion 3. By doing so, the gripping portion 32 can be disposed at a position where the gripping portion 32 does not interfere with peripheral tissue at the distal end of the endoscope cap 1. In addition, as shown in FIG. 4B, it is possible to ensure a sufficient pull-in amount of the affected tissue S gripped and lifted by the gripping portion 32, and to expand the lifting range of the affected tissue.

Figure 5:
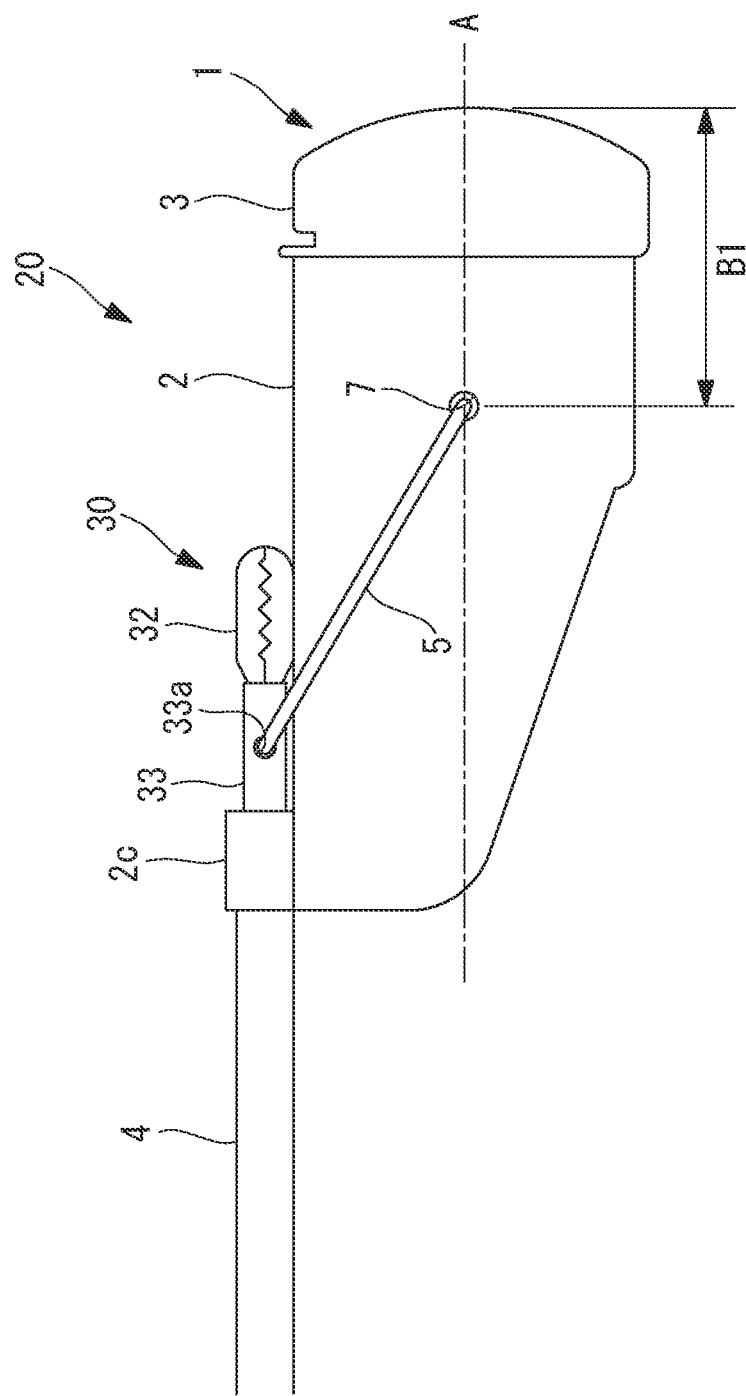
FIG. 5 is a diagram for explaining a design parameter of the endoscope cap.

FIG. 5 explains the positions of the support holes 7 in the longitudinal direction of the hood portion 2. As shown in FIG. 5, the individual support holes 7 are preferably formed at positions closer to the distal end of the hood portion 2 than the center in the longitudinal direction of the hood portion 2.

In FIG. 5, a distance B1 is a distance from the distal end of the cap portion 3 to the individual support holes 7 in the longitudinal direction of the hood portion 2. As the distance B1 increases, the pull-in amount of biological tissue increases, and the lowered position of the gripping portion 32 becomes farther from the distal end 10a of the endoscope 10. Meanwhile, as the distance B1 decreases, the pull-in amount of the biological tissue decreases, and the lowered position of the gripping portion 32 becomes closer to the distal end 10a of the endoscope 10.

As a result of the individual support holes 7 being formed at positions closer to the distal end of the hood portion 2 than the center in the longitudinal direction of the hood portion 2, it is possible to both locate the lowered position of the gripping portion 32 close to the distal end 10a of the endoscope 10 and ensure a sufficient pull-in amount of the biological tissue.

Figure 6A:
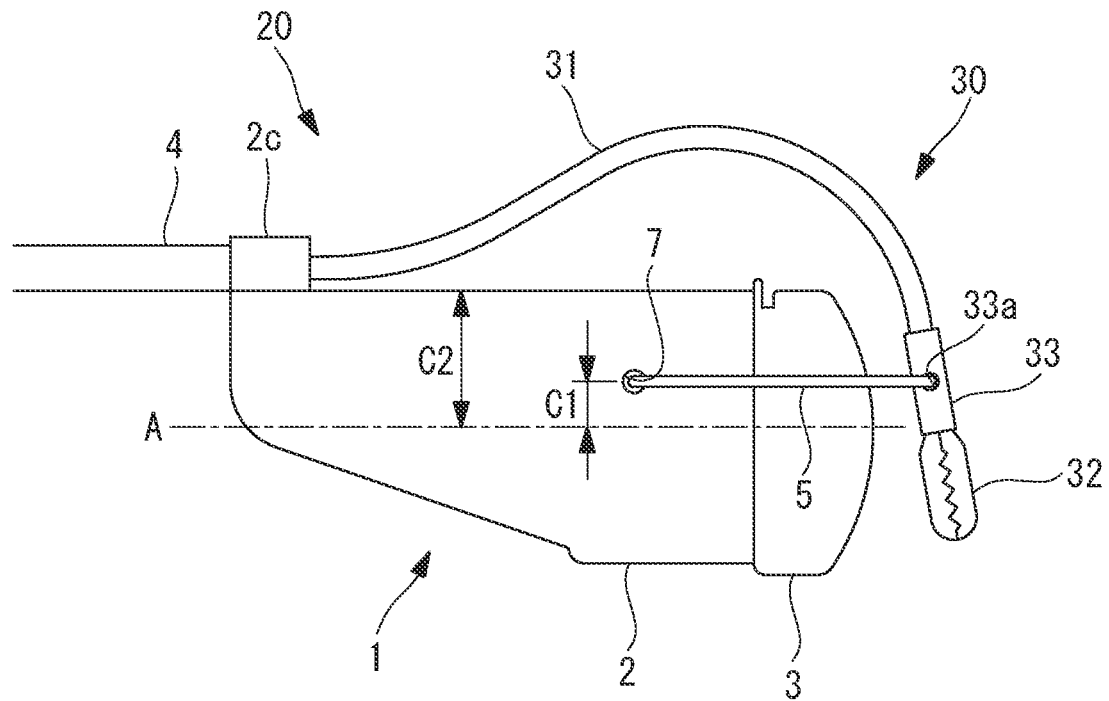
FIG. 6A is a diagram for explaining another design parameter of the endoscope cap and is a diagram showing the operation of a gripping device in a case in which a pair of support holes are located above the longitudinal axis of the hood portion.
Figure 6B:
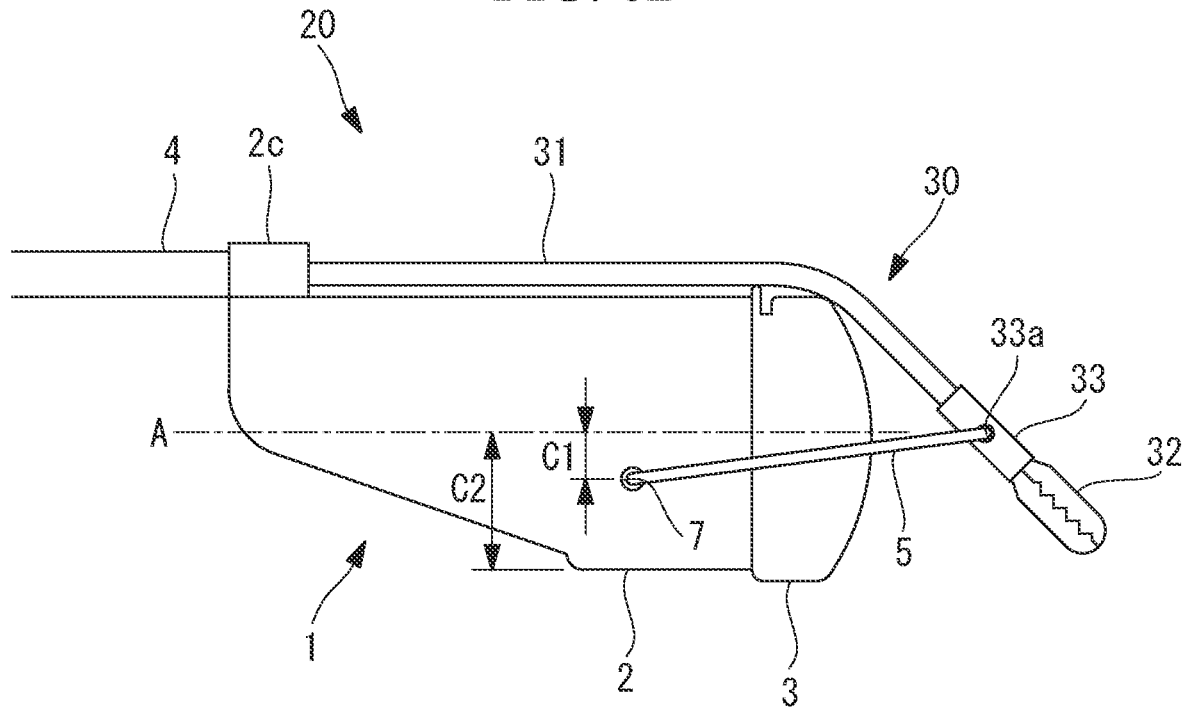
FIG. 6B is a diagram for explaining another design parameter of the endoscope cap and is a diagram showing the operation of the gripping device in a case in which the pair of support holes are located below the longitudinal axis of the hood portion.

FIGS. 6A and 6B explain the positions of the support holes 7 in the vertical direction of the hood portion 2. As shown in FIGS. 6A and 6B, a distance C1 is preferably less than or equal to half of a distance C2 in a side view of the endoscope cap 1 in the left-right direction. The distance C1 is a vertical distance from the longitudinal axis A of the hood portion 2 to the individual support holes 7, and the distance C2 is a vertical distance from the longitudinal axis A of the hood portion 2 to the outer circumferential surface of the hood portion 2, in other words, the outer diameter of the hood portion 2.

In a side view in the left-right direction, it is more preferable that the individual support holes 7 be positioned on the longitudinal axis A of the hood portion 2. In other words, the support holes 7 are provided at positions on the outer circumferential surface of the hood portion 2, which intersects a plane that includes the longitudinal axis of the channel tube 4 and that is perpendicular to a line segment connecting the longitudinal axis of the channel tube 4 and the longitudinal axis of the hood portion 2.

FIG. 6A shows a case in which the support holes 7 are provided above the longitudinal axis A. FIG. 6B shows a case in which the support holes 7 are provided below the longitudinal axis A.

As shown in FIG. 6A, in a case in which the offset amounts of the support holes 7 from the longitudinal axis A to the upper side are too large, the length of the coupling member 5 is small, and thus, the lowered position of the gripping portion 32 becomes close to the distal end 10a of the endoscope 10. However, the distal end portion of the elongated member 31 protrudes upward. This is because the coupling member 5 pivoting from the upper side toward the lower side strongly comes into contact with the distal end of the cap portion 3, and due to friction between the coupling member 5 and the cap portion 3, the force for pivoting the coupling member 5 is converted into a force for compressing the elongated member 31 between the channel tube 4 and the connector 33.

As shown in FIG. 6B, in a case in which the offset amounts of the support holes 7 from the longitudinal axis A to the lower side are too large, the length of the coupling member 5 is large, and thus, the lowered position of the gripping portion 32 becomes far from the distal end 10a of the endoscope 10; therefore, such a case is not preferable.

In the abovementioned embodiment, the two end portions of the coupling member 5 may be fixed to either the hood portion 2 or the cap portion 3.

Figure 7A:
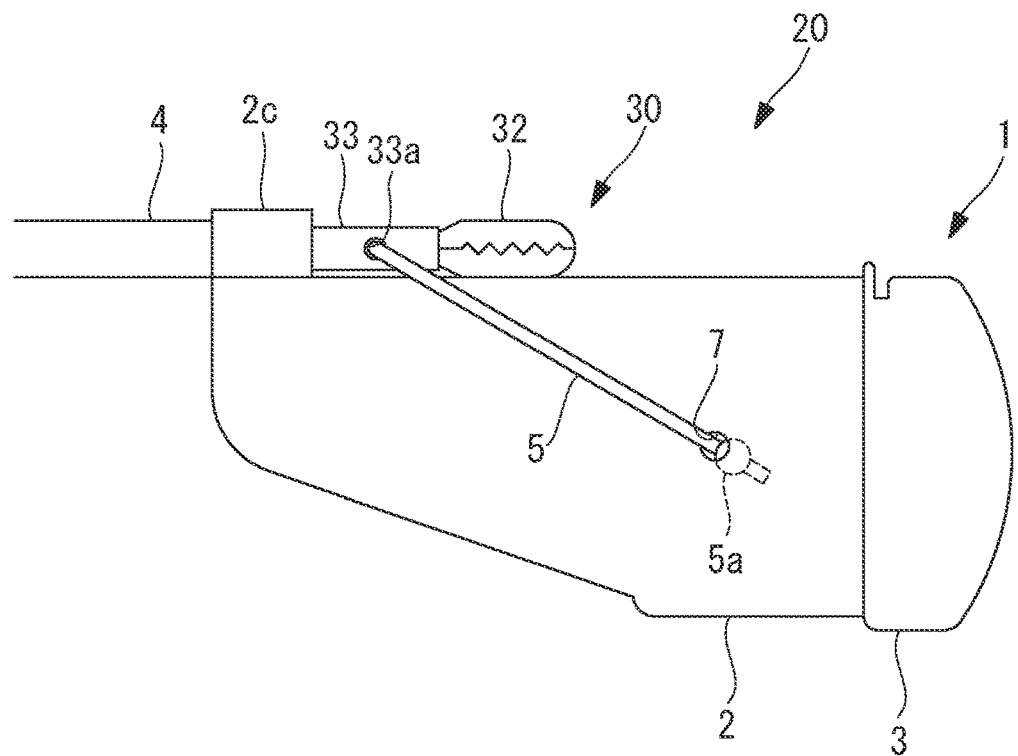
FIG. 7A is a side view of an example of an endoscope hood in which end portions of a coupling member are fixed at the support holes.

For example, as shown in FIG. 7A, the two end portions of the coupling member 5 may be fixed at the support holes 7 in the hood portion 2 by means of knots 5a that are formed at both ends of the coupling member 5 and that have outer diameters larger than the diameters of the support holes 7. The knots 5a are disposed inside the hood portion 2 and have such a structure that the coupling member 5 does not come off from the support holes 7.

Figure 7B:
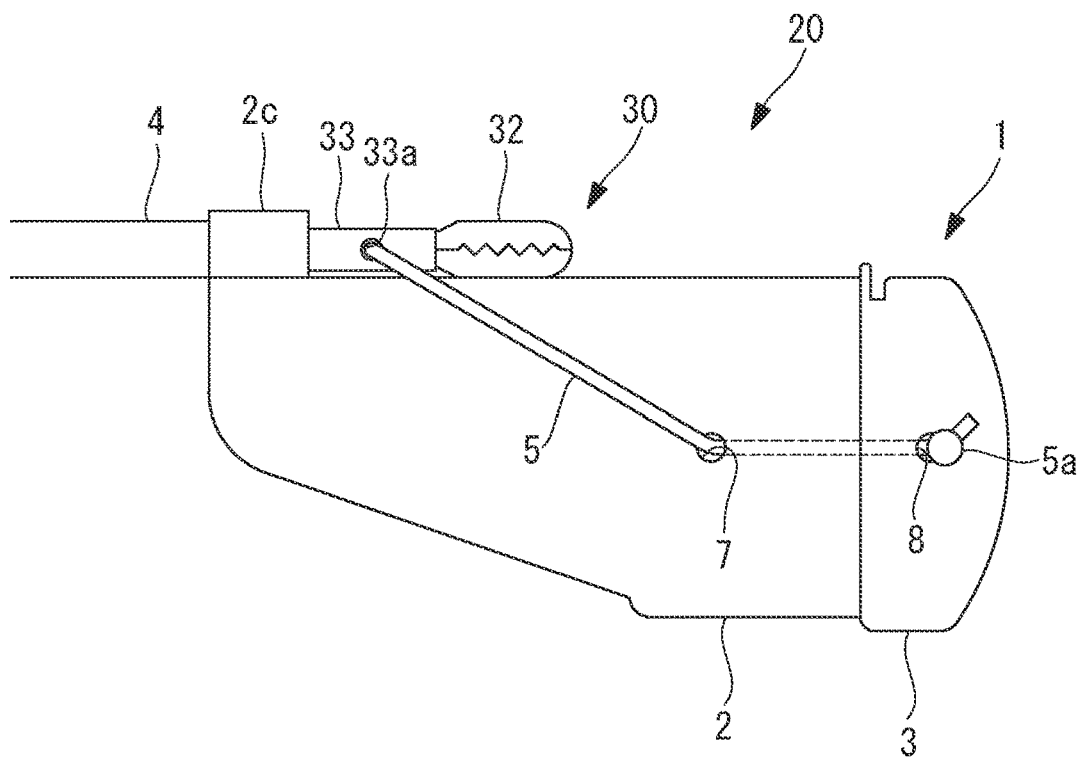
FIG. 7B is a side view of an example of an endoscope hood having fixing holes.
Figure 7C:
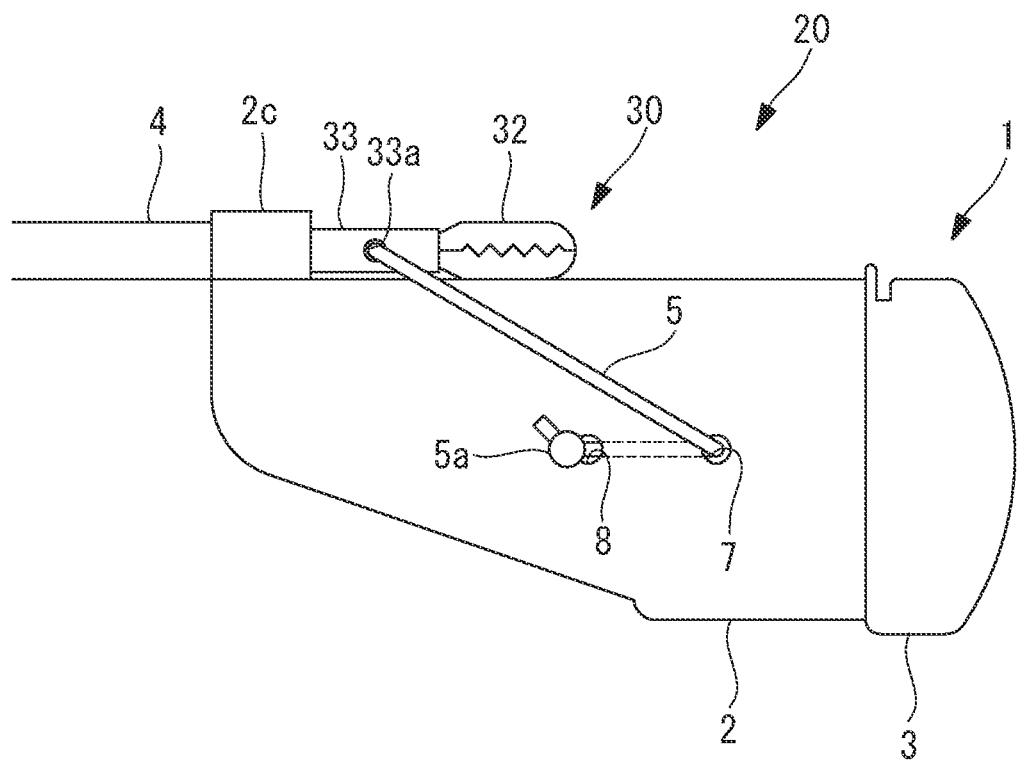
FIG. 7C is a side view of another example of the endoscope hood having the fixing holes.

Alternatively, as shown in FIGS. 7B and 7C, one of the hood portion 2 and the cap portion 3 may have a pair of fixing holes 8 for fixing the two end portions of the coupling member 5.

The pair of fixing holes 8 are provided at positions that are separated from each other in the circumferential direction of the hood portion 2 and that face each other in the left-right direction, the positions being different from those of the support holes 7. FIG. 7B shows an example in which the fixing holes 8 are provided in the cap portion 3, and FIG. 7C shows an example in which the fixing holes 8 are provided in the hood portion 2. Similar to the support holes 7, the individual fixing holes 8 penetrate from the outer circumferential surface of the hood portion 2 or the cap portion 3 to the inner circumferential surface thereof in the radial direction thereof.

The end portions of the coupling member 5 pass through the fixing holes 8 from the inside to the outside and are fixed at the fixing holes 8 by means of the knots 5a formed at the ends of the coupling member 5. Therefore, as shown in FIGS. 7B and 7C, in a case in which a single fixing hole 8 is provided for each of the end portions of the coupling member 5, the knots 5a are disposed outside the hood portion 2 or the cap portion 3.

In the case in which the end portions of the coupling member 5 are fixed at the support holes 7, the end portions of the coupling member 5 are likely to receive a force when the coupling member 5 is pivoted. By fixing the end portions of the coupling member 5 at the fixing holes 8 different from the support holes 7, it is possible to prevent the force from being applied to the end portions when the coupling member 5 is pivoted, and to prevent the end portions of the coupling member 5 from being detached from the hood portion 2.

Figure 8A:
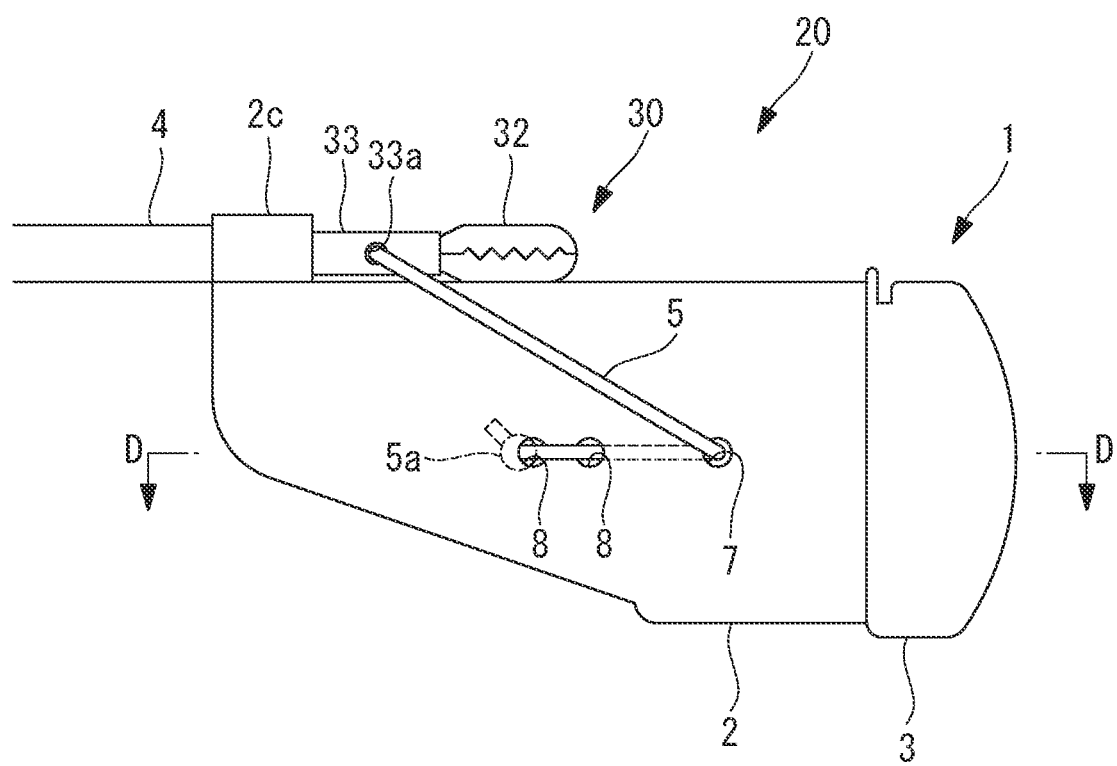
FIG. 8A is a side view of another example of the endoscope hood having the fixing holes.
Figure 9A:
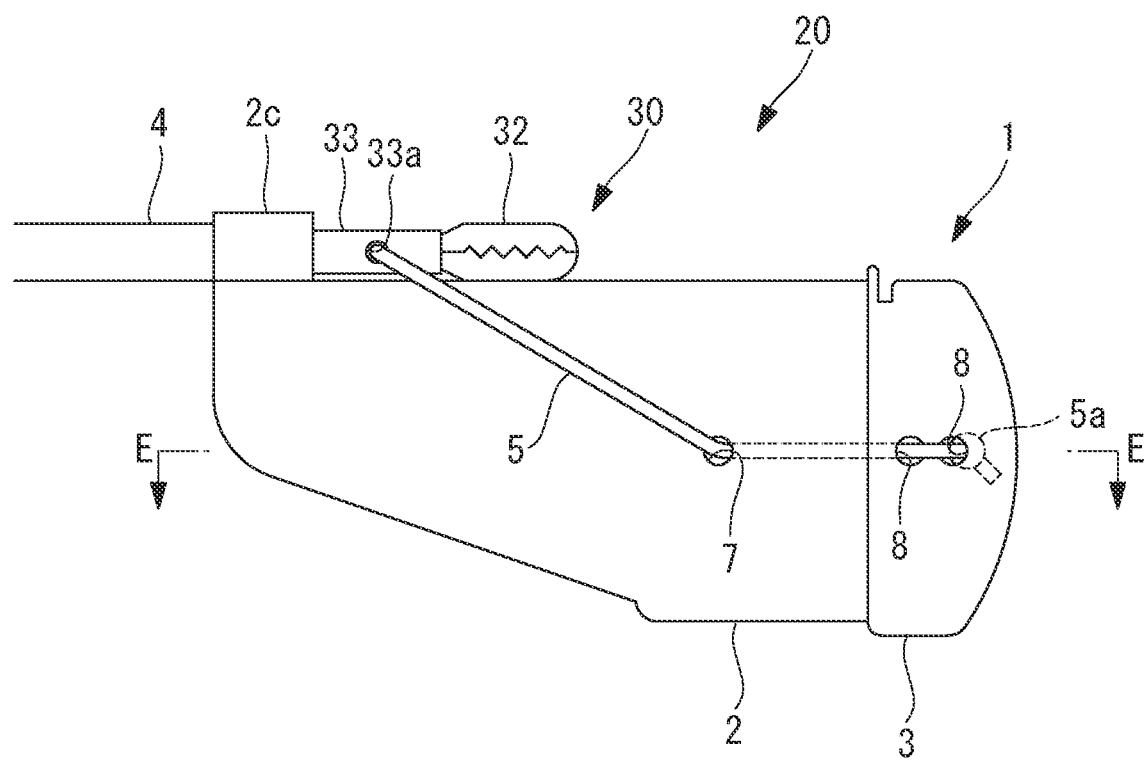
FIG. 9A is a side view of another example of the endoscope hood having the fixing holes.

As shown in FIGS. 8A and 9A, two fixing holes 8 may be provided, in a right portion of the hood portion 2 or the cap portion 3, for one end portion of the coupling member 5, and two fixing holes 8 may be provided, in a left portion of the hood portion 2 or the cap portion 3, for the other end portion of the coupling member 5. FIG. 8A shows an example in which the fixing holes 8 are provided in the hood portion 2, and FIG. 9A shows an example in which the fixing holes 8 are provided in the cap portion 3.

By providing two fixing holes 8 for each of the end portions of the coupling member 5, as described above, the knots 5a at both ends of the coupling member 5 can be disposed inside the hood portion 2, and thus, it is possible to prevent the knots 5a from coming into contact with peripheral tissue.

Figure 8B:
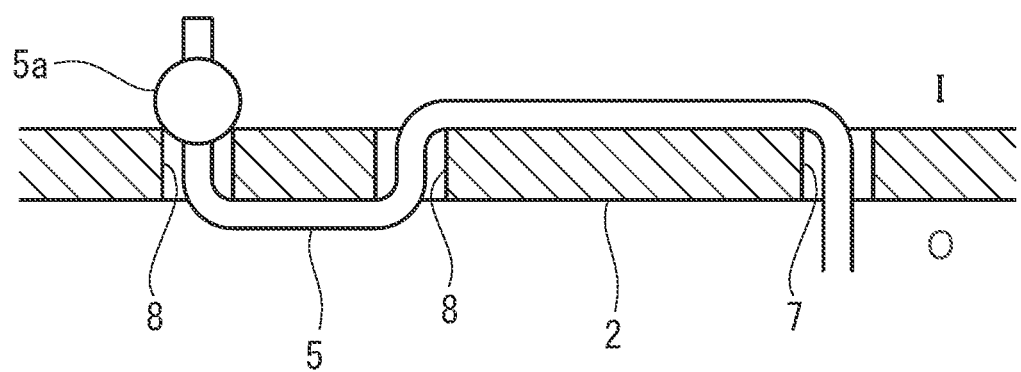
FIG. 8B is a partial sectional view of the hood portion, taken along the D-D line in FIG. 8A passing through the support hole and the fixing holes, and is a diagram for explaining handling of the end portion of the coupling member at the fixing holes.
Figure 9B:
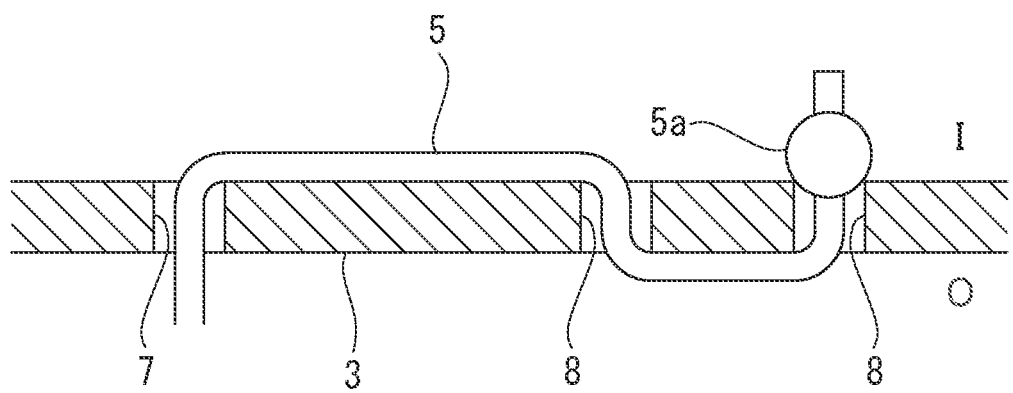
FIG. 9B is a partial sectional view of a cap portion, taken along the E-E line in FIG. 9A passing through the support hole and the fixing holes, and is a diagram for explaining handling of the end portion of the coupling member at the fixing holes.

Specifically, as shown in FIGS. 8B and 9B, the coupling member 5 passes through the support hole 7 from the outside O to the inside I, passes through one of the fixing holes 8 from the inside I to the outside O, passes through the other fixing hole 8 from the outside O to the inside I, and the knot 5a at the end of the coupling member 5 is disposed in the inside I. In FIGS. 8B and 9B, the upper side is the inside I of the hood portion 2 or the cap portion 3, and the lower side is the outside O of the hood portion 2 or the cap portion 3.

Although the two fixing holes 8 are arranged in the longitudinal direction of the hood portion 2 in the examples in FIGS. 8A and 9A, the two fixing holes 8 may be arranged in an arbitrary direction. For example, as shown in FIG. 10A, the two fixing holes 8 may be arranged in the vertical direction.

Figure 10A:
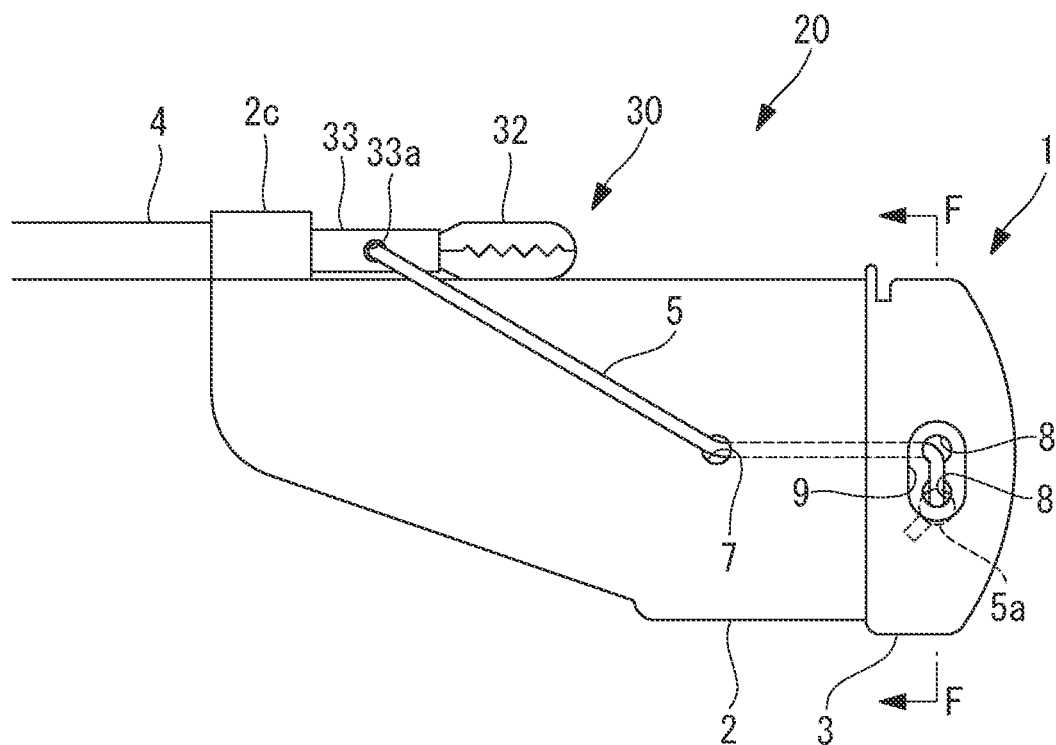
FIG. 10A is a side view of another example of the endoscope hood having the fixing holes.
Figure 10B:
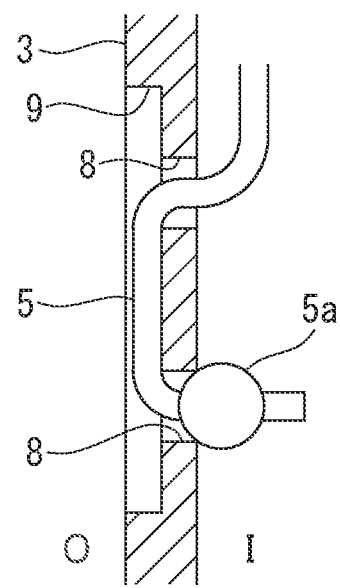
FIG. 10B is a partial sectional view of the cap portion, taken along the F-F line in FIG. 10A passing through the fixing holes and a recessed portion, and is a diagram for explaining handling of the end portion of the coupling member.

In addition, as shown in FIGS. 10A and 10B, a recessed portion 9 may be formed in the periphery of the fixing holes 8. The recessed portion 9 is formed in the outer circumferential surface of the hood portion 2 or the cap portion 3 and is recessed radially inward. By providing the recessed portion 9, it is possible to place the coupling member 5 within the outer diameter of the hood portion 2 or the cap portion 3, as shown in FIG. 10B, and to prevent the coupling member 5 from coming into contact with biological tissue. The recessed portion 9 may be filled with an adhesive. In FIG. 10B, the left side is the outside O of the hood portion 2 or the cap portion 3, and the right side is the inside I of the hood portion 2 or the cap portion 3.

Figure 11A:
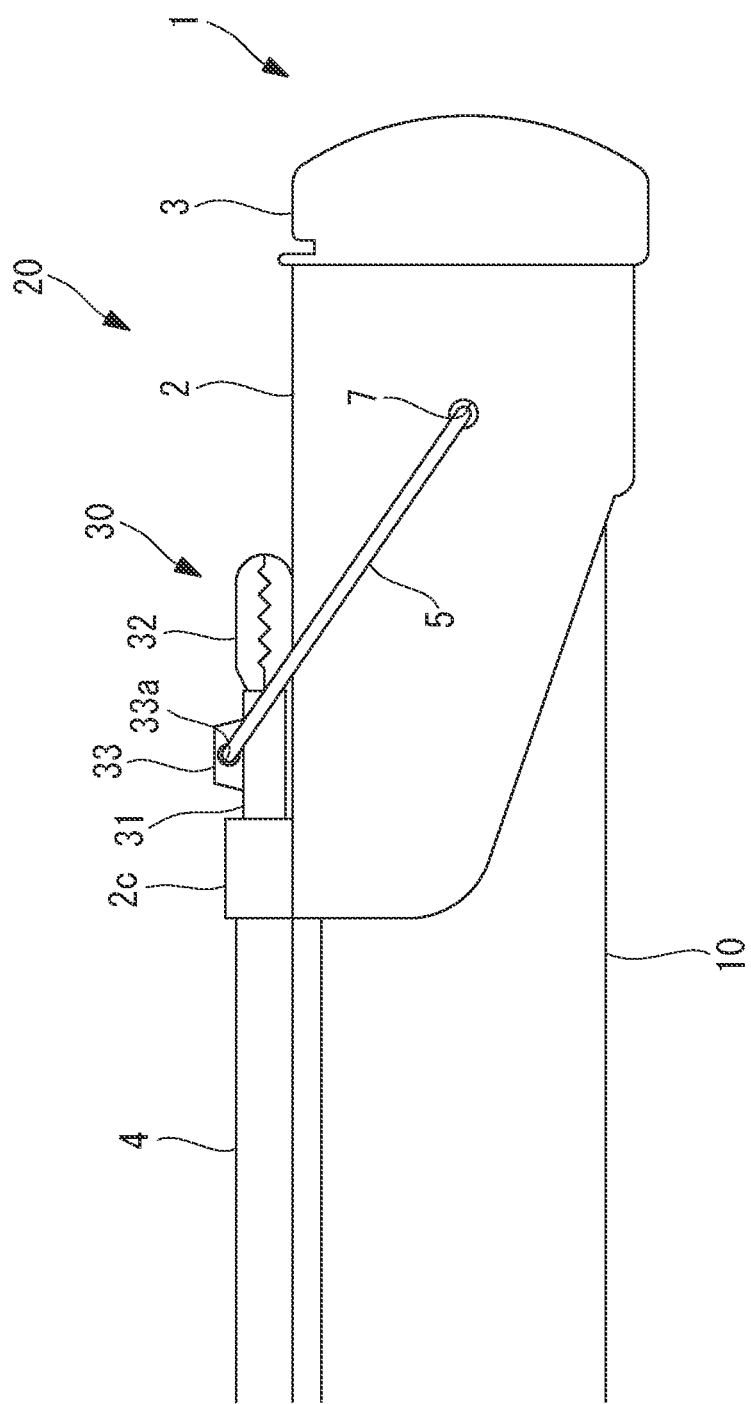
FIG. 11A is a side view of a modification of the endoscope treatment tool.

In the abovementioned embodiment, the through-hole 33a may be positioned above the elongated member 31. For example, as shown in FIG. 11A, the connector 33 may be provided on the side opposite to the hood portion 2 with respect to the elongated member 31, in the radial direction of the hood portion 2, in other words, above the elongated member 31. With this configuration, it is possible to prevent the connector 33 from interfering with the outer circumferential surface of the hood portion 2, when the gripping device 30 is moved in the longitudinal direction with respect to the hood portion 2.

Figure 11B:
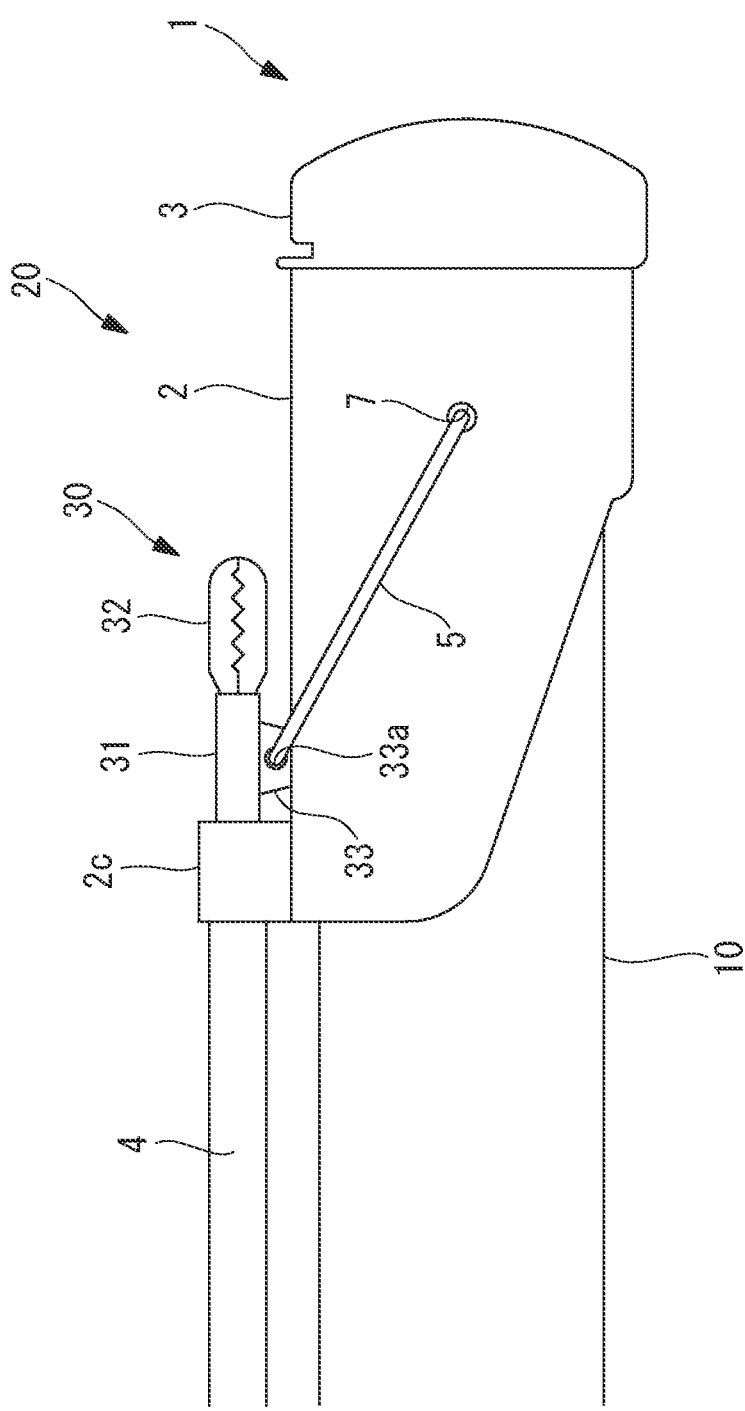
FIG. 11B is a side view of another modification of the endoscope treatment tool.

Alternatively, as shown in FIG. 11B, the connector 33 may be disposed between the hood portion 2 and the elongated member 31, in the radial direction of the hood portion 2, and the through-hole 33a may be positioned below the elongated member 31. With this configuration, it is possible to prevent the coupling member 5 from being entangled with the gripping device 30 against the intention of an operator.

The following aspects can be also derived from the embodiments.

An aspect of the present invention is an endoscope cap including: a cylindrical hood portion that is attached to an outer circumferential surface of a distal end portion of an endoscope; a cap portion that is connected to a distal end of the hood portion, that has an abutting surface against which a distal end of the endoscope is abutted in a state in which the distal end portion of the endoscope is inserted into the hood portion, and that protrudes from the distal end of the hood portion in a longitudinal direction of the hood portion; a channel tube into which an elongated device is inserted, wherein a distal end portion of the channel tube is fixed to a proximal end portion of the hood portion, and that extends substantially parallel to a longitudinal axis of the hood portion; and a linear coupling member for coupling the device with the hood portion, the coupling member being supported by the hood portion and extending along an outer circumferential surface of the hood portion, wherein a distal end of the channel tube is located closer to a proximal end of the hood portion than the abutting surface is, the hood portion has a pair of support holes that are provided at positions separated from each other in a circumferential direction of the hood portion, and into which the coupling member is inserted from an outside toward an inside of the hood portion, the coupling member is pivotable with respect to the hood portion, with the individual support holes serving as fulcrums, and the pair of support holes are formed at positions closer to the proximal end of the hood portion than the abutting surface is and also closer to the distal end of the hood portion than the distal end of the channel tube.

With this aspect, the device is inserted into the channel tube, and the device is coupled to the hood portion by means of the coupling member extending between the pair of support holes of the hood portion. In addition, the pair of support holes are arranged in the left-right direction of the endoscope, the hood portion is attached to the distal end portion of the endoscope such that the channel tube and the device are disposed on the upper side of the endoscope, and the distal end of the endoscope abutted against the abutting surface is positioned at a prescribed position with respect to the hood portion.

In this state, when the device is moved forward in the longitudinal direction with respect to the hood portion and the endoscope, the device is pivoted together with the coupling member, with the support holes serving as fulcrums, and the gripping portion at the distal end of the device is lowered in front of the distal end of the endoscope. In addition, when the device is moved backward in the longitudinal direction with respect to the hood portion and the endoscope, the device is pivoted together with the coupling member, with the support holes serving as fulcrums, and the gripping portion is raised in front of the distal end of the endoscope. Therefore, by merely pushing out the device forward, the gripping portion can be brought close to a target site of biological tissue located in a lower portion in the visual field of the endoscope, and the target site can be gripped by the gripping portion. In addition, by merely pulling the device backward, the target site gripped by the gripping portion can be lifted and pulled in to a position closer to the proximal end than the distal end of the hood portion is.

In this case, the pair of support holes serving as the pivoting center of the gripping portion are provided at positions closer to the proximal end than the abutting surface is, where the distal end of the endoscope is disposed. With this configuration, as compared with a case in which a pair of support holes are provided in a cap portion, it is possible to lower the gripping portion to a position close to the distal end of the endoscope, and also to ensure a sufficient pull-in amount of the biological tissue gripped by the gripping portion.

In the abovementioned aspect, an inner circumferential surface of the hood portion may have a tapered surface an inner diameter of which gradually increases from the distal end toward the proximal end.

In the abovementioned aspect, one of the hood portion and the cap portion may have a pair of fixing holes provided at positions that are separated from each other in the circumferential direction and that are different from those of the pair of support holes, and two end portions of the coupling member may be fixed at the pair of fixing holes.

With this configuration, as a result of providing, separately from the support holes, the fixing holes for fixing the end portions of the coupling member, it is possible to prevent a force from being applied to the end portions of the coupling member when the coupling member is pivoted.

In the abovementioned aspect, the pair of fixing holes may be provided in the cap portion or may be provided in the hood portion.

In the abovementioned aspect, knots having outer diameters larger than diameters of the support holes may be formed at two end portions of the coupling member, and the two end portions of the coupling member may be fixed at the pair of support holes.

In the abovementioned aspect, the coupling member may be a soft thread.

With this configuration, as compared with a case in which a member having high flexural rigidity, such as a metal wire, is used as the coupling member, it is possible to improve the degree of freedom in the movement of the gripping portion.

Another aspect of the present invention is an endoscope treatment tool including: an elongated gripping device; and any one of endoscope caps described above, wherein the gripping device has a long, flexible elongated member that penetrates inside the channel tube so as to be movable in the longitudinal direction, a gripping portion that is connected to a distal end of the elongated member and that grips biological tissue, and a connector that is provided on a proximal end side of the gripping portion and that is disposed closer to the distal end than the channel tube is, the connector has a through-hole that penetrates therethrough in a direction intersecting a longitudinal direction of the elongated member, and the coupling member extends between the pair of support holes through an inside of the through-hole.

Another aspect of the present invention is an endoscope system including an endoscope and the abovementioned endoscope treatment tool.

In the abovementioned aspect, a notch may be formed in a portion of the hood portion, and a tape that adheres the hood portion and the endoscope to each other along an edge of the notch may be provided.

In the abovementioned aspect, the connector may be provided on a side opposite to the hood portion with respect to the elongated member, in a radial direction of the hood portion.

With this configuration, it is possible to prevent the pivoting connector from interfering with the surface of the hood portion.

In the abovementioned aspect, the connector may be positioned between the elongated member and the hood portion, in a radial direction of the hood portion.

With this configuration, it is possible to prevent the coupling member from being entangled with the gripping device.

In the abovementioned aspect, an edge at a distal end of the cap portion may have projections extending in a direction from a proximal end of the cap portion toward the distal end, and a recess extending in a direction from the distal end of the cap portion toward the proximal end, and the coupling member may be configured to be pivotable from a first position extending along the outer circumferential surface of the hood portion to a second position at which the coupling member comes into contact with the projections of the cap portion.

In the abovementioned aspect, an edge at the distal end of the cap portion may have projections extending in a direction from the proximal end of the cap portion toward the distal end, and a recess extending in a direction from the distal end of the cap portion toward the proximal end, and a portion of the coupling member may come into contact with the projections when a portion of the gripping device passes through the recess.

REFERENCE SIGNS LIST 1 endoscope cap
2 hood portion
3 cap portion
3b projection
3c recess
4 channel tube
5 coupling member
5a knot
6 abutting surface
7 support hole
8 fixing hole
9 recessed portion
10 endoscope
10a distal end
20 endoscope treatment tool
30 gripping device (device)
31 elongated member
32 gripping portion
33 connector
33a through-hole
100 endoscope system
A longitudinal axis
S affected tissue, biological tissue

The invention claimed is:

1. An endoscope cap comprising:
a hood;
a filament configured to connect an elongated device with the hood, the filament extending along an outer circumferential surface of the hood, wherein the filament is configured to pass through a first hole provided at the elongated device,
wherein the hood has a pair of second holes that are formed at positions separated from each other in a circumferential direction of the hood, and into which the filament is inserted, the pair of second holes penetrating in a direction intersecting with a longitudinal axis direction,
wherein the hood has a pair of third holes that are formed at positions separated from each other in the circumferential direction of the hood and into which the filament is inserted, the pair of third holes penetrating in the direction intersecting with the longitudinal axis direction, and
wherein the filament is fixed at the pair of third holes.

2. The endoscope cap according to claim 1, wherein:
knots having outer diameters larger than diameters of the second holes are formed at two end portions of the filament; and
the two end portions of the filament are fixed at the pair of third holes.

3. An endoscope treatment tool comprising:
an endoscope cap according to claim 1, and
the elongated device;
wherein the endoscope cap further comprises a channel tube into which the elongated device is inserted, wherein a distal end portion of the channel tube is fixed to a proximal end portion of the hood, and that extends substantially parallel to a longitudinal axis of the hood,
the elongated device has a long, flexible elongated member that penetrates inside the channel tube so as to be movable in the longitudinal direction, the elongated device comprising a gripping portion that is connected to a distal end of the elongated member and that grips biological tissue, and a connector that is provided on a proximal end side of the gripping portion and that is disposed closer to the distal end than the channel tube is,
the connector has the first hole that penetrates therethrough in a direction intersecting a longitudinal direction of the elongated member, and
the filament extends between the pair of second holes through an inside of the first hole.

4. The endoscope treatment tool according to claim 3, further comprising:
a notch formed in a portion of the hood; and
a tape that adheres the hood and an endoscope to each other along an edge of the notch.

5. The endoscope treatment tool according to claim 3, wherein the connector is provided on a side opposite to the hood with respect to the elongated member, in a radial direction of the hood.

6. The endoscope treatment tool according to claim 3, wherein:
the endoscope cap further comprises a cap connected to a distal end of the hood;
an edge at a distal end of the cap has projections extending in a direction from a proximal end of the cap toward the distal end, and a recess extending in a direction from the distal end of the cap toward the proximal end; and
the filament is configured to be pivotable from a first position extending along the outer circumferential surface of the hood to a second position at which the filament comes into contact with the projections of the cap.

7. The endoscope cap according to claim 1, wherein the filament is passed through from an outside toward an inside of the hood.

8. An endoscope treatment tool comprising:
a forceps device; and
a hood attached to a distal end portion of an endoscope,
wherein the forceps device has a through-hole that penetrates therethrough, and a coupling member extends through a pair of first support holes, a pair of second support holes, and the through-hole,
wherein the coupling member is fixed at the pair of second support holes, and
wherein the coupling member is fixed at a position closer to a distal end of the endoscope treatment tool than the pair of first support holes.

9. An endoscope treatment tool comprising:
a forceps device; and
a hood attached to a distal end portion of an endoscope; and
a cap that is connected to a distal end of the hood,
wherein the forceps device has a flexible elongated member, a gripper and a connector and the connecter connects the gripper to the elongated member, the connector has a through-hole that penetrates therethrough in a direction intersecting a longitudinal direction of the elongated member, and a coupling member extends through a pair of first support holes, a pair of second support holes, and the through-hole,
wherein the coupling member is fixed at the pair of second support holes, and
wherein the coupling member is fixed at a position closer to a proximal end of the endoscope treatment tool than the pair of first support holes.

10. The endoscope cap according to claim 1, wherein the filament is fixed at a position closer to a distal end of the endoscope cap than the second holes.

11. The endoscope cap according to claim 10, further comprising a cap connected to a distal end of the hood,
wherein the cap has a pair of third holes, and
the filament which is passed through the second holes is fixed at the third holes.

12. The endoscope cap according to claim 1, wherein the filament is fixed at a position closer to a proximal end of the endoscope cap than the second holes.

13. The endoscope cap according to claim 12, wherein the hood has a pair of third holes, and
the filament which is passed through the second holes is fixed at the third holes.

14. The endoscope treatment tool according to claim 8, further comprising a cap connected to a distal end of the hood,
wherein the cap has the pair of second support holes, and
the coupling member which is passed through the pair of first support holes is fixed at the pair of second support fixing holes.

15. The endoscope treatment tool according to claim 9,
wherein the hood has the pair of second support holes, and
the coupling member which is passed through the pair of first support holes is fixed at the pair of second support holes.

16. The endoscope cap according to claim 1, wherein
the hood has an abutment surface positioned inside the hood, the abutment surface being configured to be abutted against a distal end of an endoscope in a state in which the distal end portion of the endoscope is inserted into the hood, and
the pair of second holes are positioned between the first hole and the abutment surface in a longitudinal direction of the hood when the elongated device is maximally retracted toward a proximal end of the elongated device.

17. The endoscope cap according to claim 16, further comprising a channel tube into which the elongated device is inserted, wherein a distal end portion of the channel tube is fixed to a proximal end portion of the hood, the channel tube extending substantially parallel to a longitudinal axis of the hood, wherein:
a distal end of the channel tube is located closer to a proximal end of the hood than the abutment surface is; and
the pair of second holes are formed at positions closer to a distal end of the hood than the distal end of the channel tube.

18. The endoscope cap according to claim 1, further comprising a cap connected to a distal end of the hood,
wherein the filament includes an end portion fixed in the cap.

19. The endoscope cap according to claim 1, wherein the filament is fixed at the different position throughout a range of motion of the elongated device.

20. The endoscope cap according to claim 1, wherein
the filament is inserted from an outer surface of the hood, and
the filament is inserted from an inner surface of the hood.

21. The endoscope treatment tool according to claim 8, wherein, the coupling member extends through the pair of first support holes from an outer surface of the hood and extends through the pair of second support holes from an inner surface of the hood.

22. The endoscope treatment tool according to claim 9, wherein coupling member extends between the pair of first support holes from an outer surface of the hood and extends through the pair of second support holes from an inner surface of the hood.

* * * * *